United States Patent
Schulz-Weiling

(10) Patent No.: US 11,724,267 B2
(45) Date of Patent: Aug. 15, 2023

(54) DEVICE FOR PROTECTING A SENSOR WINDOW

(71) Applicant: Robert Bosch GmbH, Stuttgart (DE)

(72) Inventor: Markus Schulz-Weiling, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 168 days.

(21) Appl. No.: 16/907,706

(22) Filed: Jun. 22, 2020

(65) Prior Publication Data
US 2020/0406274 A1 Dec. 31, 2020

(30) Foreign Application Priority Data
Jun. 27, 2019 (DE) .................. 102019209381.7

(51) Int. Cl.
*B05B 1/06* (2006.01)
*B05B 1/30* (2006.01)
(Continued)

(52) U.S. Cl.
CPC .............. *B05B 1/06* (2013.01); *B05B 1/3006* (2013.01); *B08B 3/02* (2013.01); *B08B 3/10* (2013.01); *B08B 13/00* (2013.01); *B60S 1/56* (2013.01); *B05B 1/005* (2013.01); *B05B 1/044* (2013.01); *B05B 7/025* (2013.01); *B05B 15/652* (2018.02);
(Continued)

(58) Field of Classification Search
CPC .. B08B 3/02; B08B 13/00; B08B 3/10; B08B 2205/00; B08B 2203/007; B05B 1/044; B05B 1/06; B05B 7/025; B05B 1/3006; B05B 1/005; B05B 15/652; G02B 27/0006; B60S 1/56; B60S 1/526; B60S 1/544; B60S 1/522; B60S 1/548; B60S 1/485; G01S 7/4813; G01S 7/4043; G01S 7/497; G01S 7/027; G01S 2007/4977; G01S 7/40
See application file for complete search history.

(56) References Cited

U.S. PATENT DOCUMENTS 10,549,726 B2 *   2/2020  Garcia Crespo ... G02B 27/0006
2003/0155001 A1 * 8/2003  Hoetzer .................... B60S 1/54
                                                        134/52
(Continued)

FOREIGN PATENT DOCUMENTS

DE     102017107835 A1    10/2017
DE     102016221858 A1     5/2018
(Continued)

*Primary Examiner* — Benjamin L Osterhout
(74) *Attorney, Agent, or Firm* — Norton Rose Fulbright US LLP; Gerard Messina

(57) ABSTRACT

A device is described for protecting a sensor window. The device includes a two-piece nozzle system and is configured for generating a first and a second fluid flow, a first piece of the two-piece nozzle system being fixedly situated with respect to the sensor window, and a second piece of the two-piece nozzle system being configured for assuming different positions with respect to the first piece of the two-piece nozzle system, and the two-piece nozzle system being aligned with respect to the sensor window to direct a predominant portion of the first fluid flow in parallel to the sensor window and to direct a predominant portion of the second fluid flow in the direction onto the sensor window.

11 Claims, 4 Drawing Sheets

(51) Int. Cl.
*B60S 1/56* (2006.01)
*B08B 13/00* (2006.01)
*B08B 3/02* (2006.01)
*B08B 3/10* (2006.01)
*G01S 7/497* (2006.01)
*G01S 7/40* (2006.01)
*B05B 7/02* (2006.01)
*B60S 1/48* (2006.01)
*B60S 1/52* (2006.01)
*B05B 15/652* (2018.01)
*G02B 27/00* (2006.01)
*B60S 1/54* (2006.01)
*G01S 7/02* (2006.01)
*G01S 7/481* (2006.01)
*B05B 1/00* (2006.01)
*B05B 1/04* (2006.01)

(52) U.S. Cl.
CPC ..... *B08B 2203/007* (2013.01); *B08B 2205/00* (2013.01); *B60S 1/485* (2013.01); *B60S 1/522* (2013.01); *B60S 1/526* (2013.01); *B60S 1/544* (2013.01); *B60S 1/548* (2013.01); *G01S 7/027* (2021.05); *G01S 7/40* (2013.01); *G01S 7/4043* (2021.05); *G01S 7/4813* (2013.01); *G01S 7/497* (2013.01); *G01S 2007/4977* (2013.01); *G02B 27/0006* (2013.01)

(56) References Cited

U.S. PATENT DOCUMENTS

| | | | |
|---|---|---|---|
| 2011/0073142 A1* | 3/2011 | Hattori | G03B 17/08 134/198 |
| 2014/0060582 A1* | 3/2014 | Hartranft | H04N 7/185 348/148 |
| 2015/0029340 A1* | 1/2015 | Taguchi | H04N 7/183 348/151 |
| 2015/0040953 A1* | 2/2015 | Kikuta | B60S 1/56 134/123 |
| 2015/0078940 A1* | 3/2015 | Kikuta | F04B 17/03 417/443 |
| 2016/0113228 A1* | 4/2016 | Holmertz | G02B 1/02 250/221 |
| 2017/0182980 A1* | 6/2017 | Davies | B05B 9/04 |
| 2017/0313287 A1* | 11/2017 | Davies | B60S 1/56 |
| 2018/0015907 A1* | 1/2018 | Rice | G05D 1/0088 |
| 2018/0086316 A1 | 3/2018 | Trebouet et al. | |
| 2019/0016306 A1* | 1/2019 | Krishnan | G05D 1/024 |
| 2019/0111895 A1* | 4/2019 | Onuma | B08B 3/02 |
| 2019/0381975 A1 | 12/2019 | Caillot et al. | |
| 2020/0001833 A1* | 1/2020 | Lomer | B60S 1/487 |

FOREIGN PATENT DOCUMENTS

| | | |
|---|---|---|
| DE | 102018113383 A1 | 12/2018 |
| DE | 102018114152 A1 | 12/2018 |
| DE | 112017001606 T5 | 12/2018 |
| DE | 102018118846 A1 | 2/2019 |
| DE | 102018132758 A1 | 6/2019 |
| WO | 0168425 A1 | 9/2001 |

\* cited by examiner

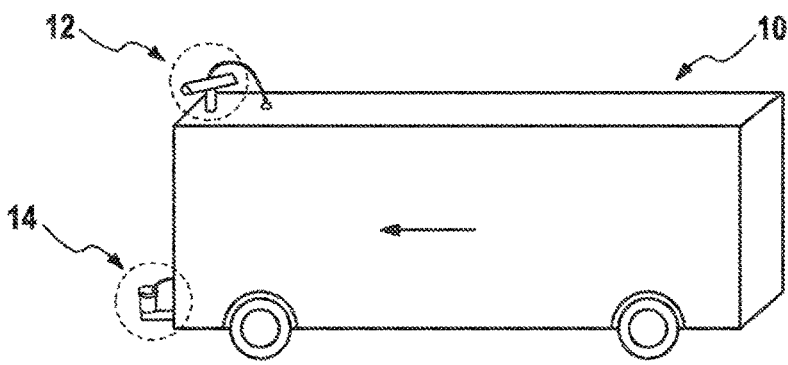
FIG. 1
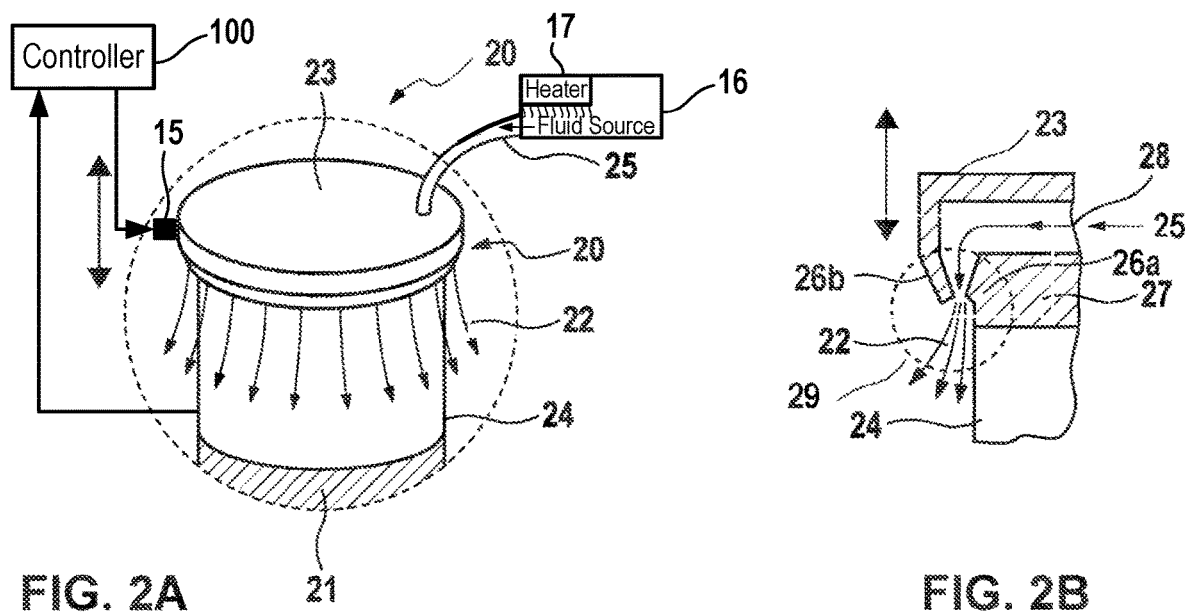
FIG. 2A
FIG. 2B

DEVICE FOR PROTECTING A SENSOR WINDOW

CROSS REFERENCE

The present application claims the benefit under 35 U.S.C. § 119 of German Patent Application No. DE 102019209381.7 filed on Jun. 27, 2019, which is expressly incorporated herein by reference in its entirety.

FIELD

The present invention relates to a device for protecting a sensor window, which includes a two-piece nozzle system and is configured for generating a first fluid flow and a second fluid flow.

BACKGROUND INFORMATION

Driver assistance systems and at least semi-automated vehicles are utilized to an increasing extent with sensors, primarily for detecting the surroundings. Since many of these sensors are mounted externally, for example, at a vehicle, these sensors are exposed to the surrounding atmosphere, which may result in a limited functional capability if these sensors are covered in dirt, are wet due to rain or dew, or are covered by snow and ice. To a particular extent, optical sensors are limited in terms of their function, for example, by dew or rain, due to the impairment of the optical transmittance of a transparent cover.

In PCT Publication No. WO01/68425A1, a unit is described for keeping optical elements in motor vehicles clean, in particular sensor or camera covers. For this purpose, the transparent cover is treated with a targeted gas flow, in particular an air flow, in such a way that during movement of the cover relative to the surroundings, no surrounding atmosphere, in particular ambient air, reaches the surface of the cover.

Sensor elements, which are situated behind a sensor window, in order to achieve a certain protective effect with the aid of the sensor window, may typically not vary their position behind this sensor window, whereby even a small-area contaminant on the sensor window may result in an impairment of the sensor effect.

SUMMARY

According to the present invention, a device for protecting a sensor window, a method for regulating a position of a piece of a nozzle system, and a utilization of a protected sensor, are provided, which at least partially achieve the described objects. Advantageous embodiments of the present invention are described herein.

The present invention is based on the finding that, with the aid of a fluid flow, such as an air flow, which is configured for directing a predominant portion of the fluid flow in parallel to a surface to be protected, slight or small objects such as rain, snow, insects, dust, or ice may be deflected, so that a sensor system is not or only slightly interfered with in terms of function. If this fluid flow may optionally also be directed directly onto the surface to be protected, a cleaning effect may be additionally achieved.

According to one aspect of the present invention, an example device for protecting a sensor window includes a two-piece nozzle system and is configured for generating a first fluid flow and a second fluid flow. A first piece of the two-piece nozzle system is fixedly situated with respect to the sensor window, and a second piece of the two-piece nozzle system is configured for assuming different positions with respect to the first piece of the two-piece nozzle system. The two-piece nozzle system is aligned with respect to the sensor window to direct a predominant portion of the first fluid flow in parallel to the sensor window and to direct a predominant portion of the second fluid flow in the direction onto the sensor window.

This device is provided, in particular, for protecting a sensor window with respect to a contamination, which may be induced by small objects, such as rain, snow, insects, dust, ice, on a sensor window.

Any surface of a sensor which is in direct contact with the surroundings is to be understood to be a sensor window, i.e., in particular, also surfaces of sensor optics in the case, for example, of optical sensors, or also non-transparent surfaces when a sensory element situated behind the non-transparent surfaces may be impaired in terms of its function, for example, by contaminants.

A two-piece nozzle system may be changed with respect to the intensity and direction of a fluid flow, which is directed through this two-piece nozzle system, by changing a relative position of the one piece of the nozzle system, which relates in particular to one of the nozzle lips, with respect to another piece of the nozzle system, which includes one further nozzle lip.

Due to the fact that the nozzle system is designed as two pieces, a first fluid flow, which may deflect small particles away from a sensor window, may be set with the aid of the nozzle system and, for example, a cleaning effect on the sensor window may be effectuated with the aid of the second fluid flow.

The first fluid flow may include a different fluid from the second fluid flow. For an optical sensor, it may be, for example, favorable to select air as the fluid, in order to achieve a deflection effect for small particles with the aid of an air flow, without the optical system being significantly adversely affected and, for a cleaning effect, the second fluid flow may select water as the fluid, in order to be able to achieve a greater cleaning effect. In particular, the pressure of the fluid flow may also increase the intensity of the cleaning effect and, for this purpose, may also be controlled up and down in alternation.

In particular when air is utilized as fluid, the fluid flow may be drawn from the surrounding air and, before the fluid flow is directed into the two-piece nozzle system, harmful particles contained in the surrounding air may be removed, if necessary, with the aid of a particle filter, which is situated in the feed line of the fluid.

With the aid of the example device for protecting a sensor window, the usability of sensor systems under non-optimal conditions, such as rain, snow, dust, insects, etc., may be expanded. This takes place, in that a focused air jet is placed over the sensor system. This air jet may keep all possible objects away from the sensor system and, if necessary, even clean the sensor system. In this way, the sensor elements may be protected and kept ready for use under non-optimal conditions, such as harsh environmental conditions.

In particular, the air jet may be actively moved or regulated in terms of the strength of the focusing by changing the relative position of the second piece of the two-piece nozzle system, in order to achieve a certain cleaning effect. For this purpose, the fluid flow may also be directed, for example, directly onto the optical system or the sensor window, or directed away therefrom.

Moreover, for example, the cleaning effect may be enhanced, in that the fluid is heated; in addition, the heated fluid, for example, water or air, may remove frozen water from the sensor window.

Due to the different alignment and, if necessary, a different intensity or a stronger fluid flow, together with the positioning of the fluid flow with respect to a sensor window, the sensor window may be cleaned, for example, after a time of inactivity of the sensor system. For this purpose, in particular, a different fluid may also be utilized from that for the functionality of deflecting objects with the aid of a fluid flow predominantly directed in parallel to the window.

Typical sensor elements such as cameras, LIDAR systems, or RADAR systems, which are interfered with by small objects, such as rain, snow, insects, dust, ice, etc., on the optical system or a protective housing, may be provided with the device for protecting a sensor window.

The radiation-transmissive element, through which radiation exits or enters the sensor system, is referred to as the optical system. The sensor optical system is protected temporarily or permanently, in that a focused air jet is built up a few millimeters in front of the optical system. Slight objects are deflected away by this air jet, without the sensor system being interfered with in terms of its function. The fluid flow may be generated with the aid of a compressed air reservoir, a fan, or a compressor, and made available, with the aid of a feed line, for the device encompassing the two-piece nozzle system. The device for protecting a sensor window may be an integral part of a sensor element or may be adapted, as a separate component, to a sensor element. The described compressed air reservoir may also provide air for multiple devices encompassing the nozzle system.

In particular, the two-piece nozzle system may be configured in such a way that the first piece and the second piece permanently assume the same position with respect to one another.

According to one aspect of the present invention, it is provided that the two-piece nozzle system is configured for generating the first fluid flow in a first position of the second piece of the two-piece nozzle system, and the second fluid flow in a second position of the second piece of the two-piece nozzle system.

Due to the fact that the nozzle system is configured as two pieces, the fluid flow may be directed in different directions by changing the relative position of the first piece of the nozzle system with respect to the second piece of the nozzle system, without the need to align, for example, additional deflecting or guide plates in different directions in relation to a fluid flow. In the process, in particular, an interaction of the individual lips of the two pieces of the nozzle system may be advantageously utilized.

According to one further aspect of the present invention, it is provided that the second piece of the two-piece nozzle system is configured for optionally directing the second fluid flow onto subareas of a predominant portion of the sensor window.

Due to such a design of the two-piece nozzle system, it is made possible that the fluid flow may be directed directly onto different areas of at least one predominant portion of the total area of the sensor window, in order to utilize the fluid flow, in a targeted manner, for example, at dirty or icy areas of the sensor window. Therefore, it may be achieved that these areas are, for example, cleaned or de-iced.

According to one further aspect of the present invention, it is provided that the example device encompasses a controller and an electromechanical unit, which is configured for regulating the position of the second piece of the two-piece nozzle system in relation to the sensor window depending on a sensor signal.

With the aid of such a controller, in the case of which a sensor signal is present at an input of the controller, with the aid of the electromechanical unit, which is configured for acting upon the second piece of the two-piece nozzle system in such a way that the two-piece nozzle system may assume different positions of the second piece of the nozzle system with respect to the first piece of the nozzle system. Such a sensor signal may be generated by a sensor, which monitors the sensor window with respect to interferences of the surface, and to move the second piece of the nozzle system into a position, so that a detected area including interferences may be removed by the second fluid flow. Alternatively or additionally, the sensor protected by the sensor window may provide the sensor signal.

According to one aspect of the present invention, it is provided that the second piece of the two-piece nozzle system is configured for covering an at least predominant portion of the sensor window with the aid of a cover.

According to one aspect of the present invention, it is provided that the second piece of the two-piece nozzle system is configured for covering the entire sensor window with the aid of a hood-like portion of the second piece of the two-piece nozzle system.

With the aid of such a cover or hood, it is achieved that the sensor window is protected against environmental influences in the resting state of the sensor.

According to one aspect of the present invention, it is provided that a second lip of the second piece of the two-piece nozzle system interacts with a first lip of the first piece of the two-piece nozzle system in such a way that a fluid flow, which is fed to the two-piece nozzle system, directs the fluid flow in different directions depending on a position of the second lip of the second piece of the two-piece nozzle system with respect to a first lip of the first piece of the two-piece nozzle system.

With the aid of the first lip and the second lip and the interaction of the first lip and the second lip of the first piece and the second piece, respectively, of the two-piece nozzle system and, in particular, a molding of the first lip and/or the second lip, the nozzle unit may advantageously affect the fluid flow and steer it into a desired direction.

According to one aspect of the present invention, it is provided that the sensor window and the nozzle system interact with one another, via the shape of the sensor window and/or the position of the second piece of the two-piece nozzle system, in such a way that a protection and/or cleaning effect of the fluid flow are/is intensified by an airflow.

Therefore, the fluid jet, which is generated, for example, by a fan or a compressor, is assisted by the airflow. This takes place with the aid of an aerodynamic design, which superimposes airflow onto the air jet from the fan and, in this way, intensifies the desired effect. In the case of high vehicle speeds, the relative speeds of interfering objects are greater, which may be compensated for, for example, by a greater fluid flow speed or a greater fluid flow amount.

The external shape of the second piece of the two-piece nozzle system may therefore be configured in such a way that, for example, an outer fluid flow, which impacts the second piece of the two-piece nozzle system from outside the two-piece nozzle system, in particular also impacting as a function of a relative speed of a vehicle, is collected and/or directed, intensifies the effect of the fluid flow, which acts within the two-piece nozzle system, in terms of its effect.

According to one further aspect of the present invention, it is provided that a predominant portion of the fluid contained in the fluid flow includes a gas, in particular, air and/or water.

As explained above, this yields the possibility of applying different effects of the fluid flow onto the sensor window, such as a cleaning effect by water as a fluid or a deflection effect by air as a fluid.

According to one further aspect of the present invention, it is provided that the fluid flow is heated before it flows along at least one of the lips of the nozzle unit.

According to one further aspect of the present invention, it is provided that the fluid flow is heated before it flows into the nozzle unit.

Therefore, it may be achieved that the cleaning effect becomes better or the, for example, ice on the sensor window may be better removed.

As a result, it may be achieved that an icy sensor window is de-iced due to the heat input from the fluid flow, the air, and/or water, or, for example, a cleaning effect for the sensor window is intensified by the use of water as a fluid.

In accordance with an example embodiment of the present invention, a method is provided for regulating the position of the second piece of the above-described two-piece nozzle system, in which sensor data of the sensor protected by the device, the environmental conditions, vehicle speeds, precipitation types, or precipitation amounts are characterized and, depending on a result of this characterization, the position of the second piece of the two-piece nozzle system is set.

As a result, it may be achieved that, depending on the environmental conditions, the second piece of the two-piece nozzle system is selected in terms of its position with respect to the first piece of the two-piece nozzle system. If a drizzling rain is detected, for example, with the aid of the sensor signal, which impacts the surface of the sensor window and turns into ice due to the low temperatures on the sensor window, the second piece of the two-piece nozzle system may be moved into an area which is particularly relevant for the sensor and keep this area ice-free with the aid, for example, of hot air having a high air flow.

In accordance with an example embodiment of the present invention, a utilization of a sensor is provided, which is situated behind the sensor window and is protected with the aid of the above-described device, for controlling an at least semi-automated platform.

Due to the fact that the functionality may be maintained and/or improved with the aid of the device under different environmental conditions, an expanded possible use of the at least semi-automated platform therefore results.

A mobile platform may be understood to be an at least partially automated system, which is mobile, and/or a driver assistance system of a vehicle. One example may be an at least partially automated vehicle or a vehicle including a driver assistance system. This means, in this context, that an at least partially automated system contains a mobile platform with respect to an at least partially automated functionality, but a mobile platform also contains vehicles and other mobile machines, including driver assistance systems. Further examples for mobile platforms may be driver assistance systems encompassing multiple sensors, mobile multisensor robots, such as robotic vacuum cleaners or lawn mowers, a multisensor monitoring system, a production machine, a personal assistant, or an access control system. Each of these systems may be a fully or partially automated system.

BRIEF DESCRIPTION OF THE DRAWINGS

Exemplary embodiments of the present invention are represented in an outlined manner in FIGS. 1 through 6 and in the following embodiments and are explained in greater detail in the following.

FIG. 1 shows a vehicle including two different sensor systems.

FIG. 2A shows a first exemplary embodiment including an outlined perspective view.

FIG. 2B shows a first exemplary embodiment including an outlined detail of a cross section.

DETAILED DESCRIPTION OF EXAMPLE EMBODIMENTS

Figure 3:
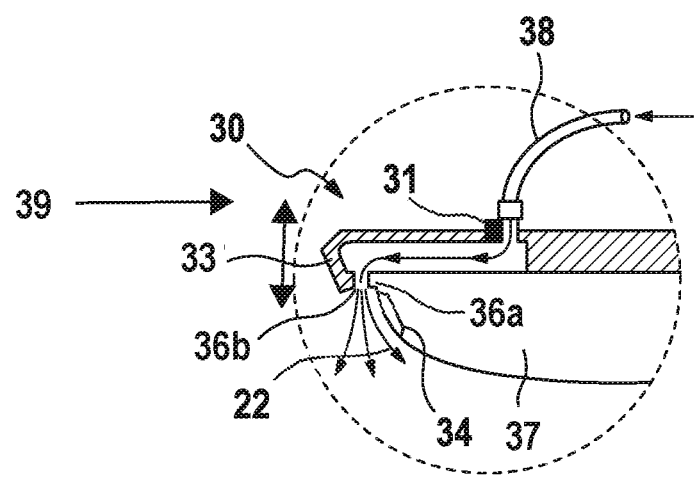
FIG. 3 shows a second exemplary embodiment of a two-piece nozzle system.

FIG. 1 schematically shows a vehicle 10, which moves in a direction indicated with the aid of an arrow and includes a first sensor system, which encompasses a first exemplary embodiment 14 of the device for protecting a sensor window, and a second sensor system encompassing a second exemplary embodiment 12 of the device for protecting a sensor window, each of which is mounted on an outer side of vehicle 10.

When the vehicle moves in the direction indicated with the aid of the arrow, the two sensor systems encompassing the devices for protecting sensor window 12, 14 are acted upon by the airflow from the direction opposite the movement direction, whereby small objects may act upon particular sensor windows 24, 34 and may adversely affect the function of a sensor situated behind particular sensor windows 24, 34.

FIG. 2*a* schematically shows, arranged on a base 21, a cylindrical, transparent sensor cover 24 of the first sensor system including a first exemplary embodiment 20 of the device for protecting a sensor window 24, which guides a fluid flow 22 with the aid of a two-piece nozzle system including a first piece, which is not visible here, and a second piece 23, primarily tangentially along cylindrical sensor cover 24. Fluid flow 22 may be introduced into device 20 including second piece 23 and a first piece of the two-piece nozzle system, for example, with the aid of a fluid source 16, which is schematically shown in FIG. 2*a* and which can be a compressor, or fan system, or fluid reservoir (not outlined) via feed line 25. In an example embodiment, a heater 17, which is schematically illustrated in the figure, heats the fluid provided by fluid source 16. The, and the two-piece nozzle system may be guided tangentially along sensor window 24 with the aid of an interaction of lips 26*a*, 26*b*, according to FIG. 2*b*, of the two-piece nozzle system. Second piece 23 of the two-piece nozzle system is configured for assuming different positions with respect to sensor window 24.

Device 20 of the first exemplary embodiment may be designed, in particular, to be rotationally symmetrical in order to protect a cylindrical sensor window 24 of a sensor system. In particular, such a sensor system may protect a LIDAR sensor system. Cylindrical sensor window 24 may be configured for being rotated with respect to base 21 and, therefore, for improving the cleaning effect.

This means, in other words, that second piece 23 of the two-piece nozzle system is configured to be movable with respect to first piece 27 of the sensor system and, in FIG. 2*a*, may carry out an up-and-down motion with respect to base 21, for example under influence of an electromechanical unit 15, schematically illustrated in the figure, which is controlled by a controller 100, also schematically illustrated in the figure, based on sensor signals received by the controller 100 from the sensor covered by the sensor window 24. Due to such an up-and-down motion, second piece 23 of the two-piece nozzle system may also assume a second position with respect to first piece 27, first lip 26*a* of first piece 27 and second lip 26*b* of second piece 23 then interacting in such a way that a predominant portion of the fluid flow is directed in the direction onto sensor window 24.

A detail of a cross section of first exemplary embodiment 20 is schematically shown in FIG. 2B. A second piece 23 of the two-piece nozzle system interacts, in lip area 29 of the nozzle system, with a first piece 27 of the two-piece nozzle system in such a way that, due to the position and the shape of second lip 26*b* of second piece 23 of the two-piece nozzle system, a predominantly tangential air flow 22 is guided along cylindrical sensor window 24.

Via a feed line 25, for this purpose, a fluid flow 28 may be guided into lip area 29 of the two-piece nozzle system. When second piece 23 of the two-piece nozzle system assumes a second position with respect to first piece 27, which has shifted, for example, in the direction onto base 21, for example, second lip 26*b* of second piece 23 of the nozzle system, together with first lip 26*a* of first piece 27 of the two-piece nozzle system, causes a predominant portion of fluid flow 22 to be directed in the direction onto the sensor window. In all exemplary embodiments, the fluid may be predominantly liquid or also predominantly gaseous; in particular, the fluid may also be made up of a mixture of a liquid and a gaseous phase also of different fluid substances.

FIG. 3 schematically shows a second exemplary embodiment 30 of the device for protecting a sensor window including a two-piece nozzle system encompassing a second piece 33 of the two-piece nozzle system, which is movably situated with respect to first piece 37. A fluid flow is directed, via a feed line 38, into a lip area of the two-piece nozzle system, this lip area being formed of the functional flow area of a first lip 36*a* of first piece 37 of the two-piece nozzle system and a second lip 36*b* of second piece 33 of the two-piece nozzle system.

Due to the interaction of first lip 36*a* and second lip 36*b*, in a first relative position of second piece 33 with respect to first piece 37 of the two-piece nozzle system, a predominant portion of a first fluid flow may be directed in parallel to a sensor window 34 of second exemplary embodiment 30.

In a second position of second piece 33 of the two-piece nozzle system, which is formed, for example, with the aid of a rotating device 31, fluid flow 22 may be directed in the direction onto sensor window 34 of the sensor system of second exemplary embodiment 30.

Sensor body 37 is designed, in a subarea, for forming first piece 37 of the two-piece nozzle system.

In the case of a relative speed of device 30 for protecting a sensor window 34 with respect to the ambient air, an airflow 39 arises, which, among other things, impacts second piece 33 of the two-piece nozzle system and is deflected in such a way that it is superimposed on fluid flow 22 and intensifies the deflection effect of fluid flow 22.

Figure 4:
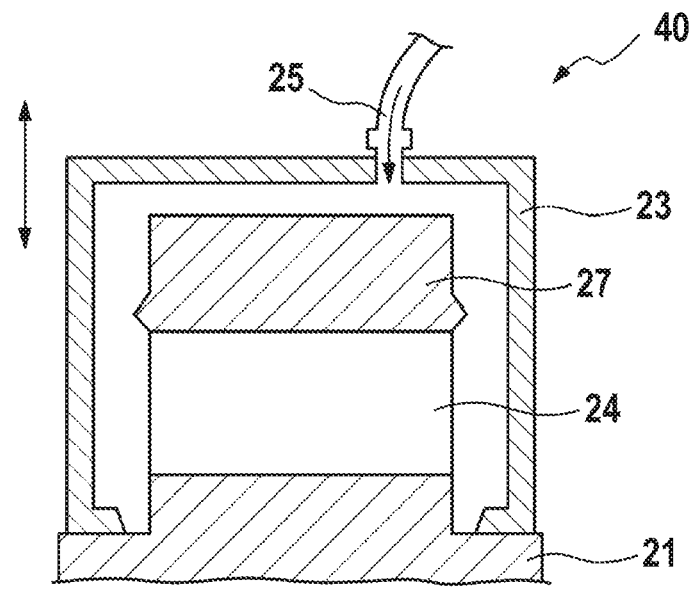
FIG. 4 shows a third exemplary embodiment of a two-piece nozzle system in a first position.
Figure 5:
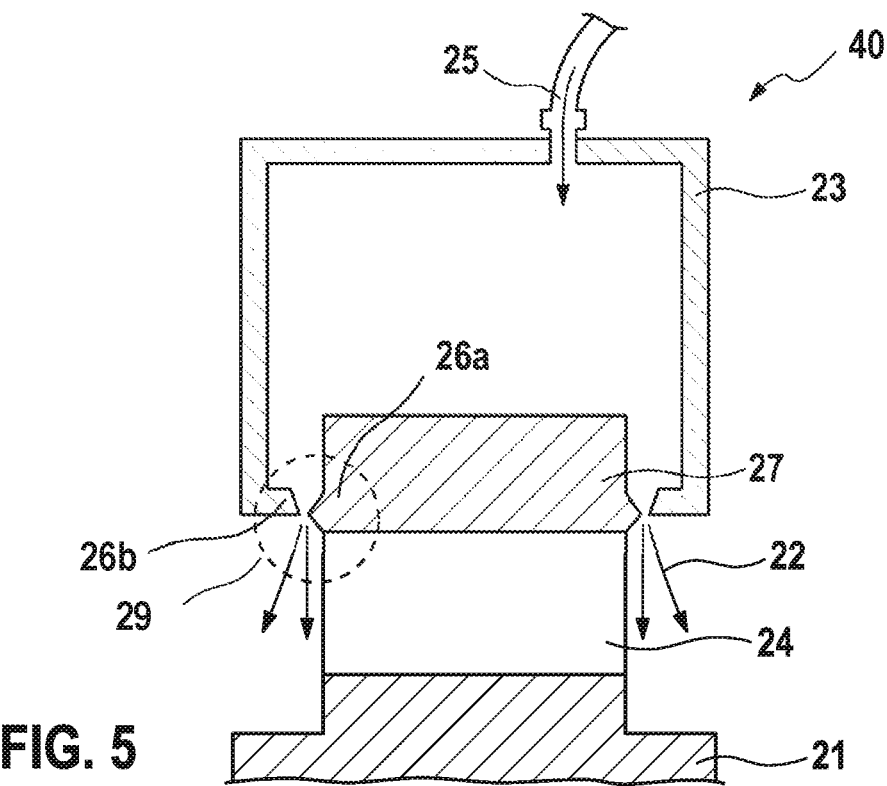
FIG. 5 shows the third exemplary embodiment in a second position.
Figure 6:
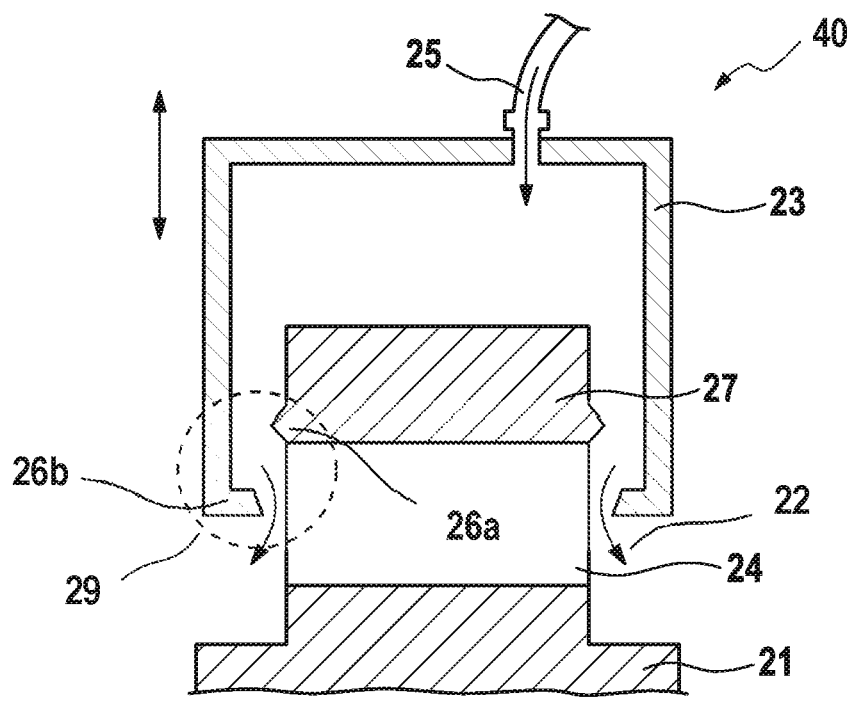
FIG. 6 shows the third exemplary embodiment in a third position.

In FIGS. 4 through 6, a third exemplary embodiment is outlined, in which a second piece 23 of the two-piece nozzle system is situated in three different positions in relation to a first piece 27 of the two-piece nozzle system. In FIG. 4, it is represented that second piece 23 of the two-piece nozzle system is configured and designed for forming a cover for the entire sensor system and, in this outlined third position of second piece 23 of the nozzle system in relation to first piece 27 of nozzle system, completely covers sensor window 24. As a result, the sensor window may be protected against environmental influences when the sensor is not active.

Cylindrical sensor window 24 is supported by a base 21 and first piece 27 of the two-piece nozzle system is configured on a side opposite the base. A fluid may be introduced into this two-piece nozzle system via a feed line 25.

FIG. 5 outlines a cross section of a rotationally symmetrical device, the two-piece nozzle system being in a first position in which a second lip 26*b* of second piece 23 of the two-piece nozzle system interacts with first lip 26*a* of first piece 27 of the two-piece nozzle system in such a way that an at least predominant portion of fluid 22 fed via fluid feed line 25 is directed in parallel to sensor window 24.

FIG. 6 outlines the two-piece nozzle system in a second position of second piece 23 of the two-piece nozzle system in relation to first piece 27 of the nozzle system, in which second piece 23 interacts with first piece 27 of the nozzle system, in particular via an interaction of first lip 26*a* with second lip 26*b* of the second piece of the two-piece nozzle system, in such a way that a predominant portion of the fluid flow, which is introduced via connection 25 into the nozzle system, is directed in the direction onto sensor window 24.

What is claimed is:

1. A device for protecting a sensor window, comprising:
   a feed line that is connectable to a fluid source;
   an electromechanical unit; and
   a two-piece nozzle that includes:
      a first piece that is fixedly situated with respect to the sensor window; and
      a second piece that is movable by the electromechanical unit between:
         a first position relative to the first piece at which, when fluid from the fluid source is fed via the feed line to an output of the two-piece nozzle, the two-piece nozzle outputs the fluid as a first fluid flow that is predominantly directed in parallel to the sensor window; and
         a second position relative to the first piece at which, when the fluid from the fluid source is fed via the feed line to the output of the two-piece nozzle, the two-piece nozzle outputs the fluid as a second fluid flow that is predominantly directed onto the sensor window.

2. The device as recited in claim 1, wherein the second piece of the two-piece nozzle is movable along the sensor window to shift the output of the two-piece nozzle to different subareas of a predominant portion of the sensor window.

3. The device as recited in claim 1, further comprising:
   a controller, wherein the controller is configured to operate the electromechanical unit to shift the second piece of the two-piece nozzle between the first and second positions depending on a sensor signal received by the controller.

4. The device as recited in claim 1, wherein the second piece of the two-piece nozzle system is configured to cover at least a predominant portion of the sensor window.

5. The device as recited in claim 1, wherein the second piece of the two-piece nozzle includes a hood configured to cover an entirety of the sensor window.

6. The device as recited in claim 1, wherein:
the first piece of the two-piece nozzle includes a first lip;
the second piece of the two-piece nozzle includes a second lip; and
the first and second fluid flows are alternatively generated, respectively, by a first interaction between the first and second lips caused by the second piece being in the first position and a second interaction between the first and second lips caused by the second piece being in the second position.

7. The device as recited in claim 1, wherein the second piece of the two-piece nozzle is movable relative to the sensor window to maintain an at least limited functionality of a sensor, which is protected by the sensor window, even when there are environmental influences on the sensor window.

8. The device as recited in claim 1, wherein the sensor window and the two-piece nozzle interact with each other via a shape of the sensor window and/or a position of the second piece of the two-piece nozzle in such a way that a protection and/or a cleaning of the fluid flow is intensified by an airflow of at least one of the first and second fluid flows.

9. The device as recited in claim 1, wherein a predominant portion of the fluid contained in the first and second fluid flows includes air and/or water.

10. The device as recited in claim 1, further comprising a heater, wherein the device is configured to use the heater to heat the fluid of at least one of the first and second fluid flows before the fluid flows into the two-piece nozzle.

11. A method for using a system that includes (a) a fluid source, and (b) a device that includes a feed line connected to the fluid source, an electromechanical unit, and a two-piece nozzle, the two-piece nozzle including a first piece that is fixedly situated relative to a sensor window of a sensor and a second piece that is movable by the electromechanical unit between (i) a first position relative to the first piece at which, when fluid from the fluid source is fed via the feed line to an output of the two-piece nozzle, the two-piece nozzle outputs the fluid as a first fluid flow that is predominantly directed in parallel to the sensor window and (ii) a second position relative to the first piece at which, when the fluid from the fluid source is fed via the feed line to the output of the two-piece nozzle, the two-piece nozzle outputs the fluid as a second fluid flow that is predominantly directed onto the sensor window, wherein the method comprises:
obtaining sensor data of the sensor, the sensor data characterizing environmental conditions, vehicle speeds, precipitation types, or precipitation amounts; and
depending on a result of the characterization, controlling the electromechanical unit to set the second piece of the two-piece nozzle into one of the first and second positions.

* * * * *